(12) United States Patent
Murakami et al.

(10) Patent No.: US 7,987,387 B2
(45) Date of Patent: Jul. 26, 2011

(54) FILE SHARING SYSTEM AND METHOD FOR STORING AND MANAGING FAILURE INFORMATION BASED ON STATUSES OF A MAIN CONTROL AND A POWER SUPPLY

(75) Inventors: Shigenori Murakami, Odawara (JP); Akira Murotani, Odawara (JP)

(73) Assignee: Hitachi, Ltd., Tokyo (JP)

( * ) Notice: Subject to any disclaimer, the term of this patent is extended or adjusted under 35 U.S.C. 154(b) by 313 days.

(21) Appl. No.: 12/210,460

(22) Filed: Sep. 15, 2008

(65) Prior Publication Data

US 2010/0017629 A1 Jan. 21, 2010

(30) Foreign Application Priority Data

Jul. 17, 2008 (JP) .................................. 2008-185641

(51) Int. Cl.
G06F 11/00 (2006.01)
G06F 1/26 (2006.01)
(52) U.S. Cl. ................. 714/22; 714/24; 714/27; 714/30
(58) Field of Classification Search .............. 714/9, 36, 714/40, 44, 22, 24, 27, 30
See application file for complete search history.

(56) References Cited

U.S. PATENT DOCUMENTS

| | | | | |
|---|---|---|---|---|
| 5,699,510 A * | 12/1997 | Petersen et al. | ............ | 714/54 |
| 5,828,823 A * | 10/1998 | Byers et al. | ............ | 714/24 |
| 6,038,669 A * | 3/2000 | Yang | ............ | 713/300 |
| 6,446,224 B1 * | 9/2002 | Chang et al. | ............ | 714/54 |
| 6,651,190 B1 * | 11/2003 | Worley et al. | ............ | 714/43 |
| 6,862,695 B2 * | 3/2005 | Lin | ............ | 714/36 |
| 7,089,451 B2 * | 8/2006 | Ote et al. | ............ | 714/31 |
| 7,568,132 B2 * | 7/2009 | Nakayama et al. | ............ | 714/48 |
| 7,581,137 B2 * | 8/2009 | Okada et al. | ............ | 714/24 |
| 7,836,349 B2 * | 11/2010 | Kakihara et al. | ............ | 714/42 |
| 7,844,844 B2 * | 11/2010 | Hijazi et al. | ............ | 713/323 |
| 7,861,127 B2 * | 12/2010 | Yamashita | ............ | 714/57 |
| 2004/0153773 A1 * | 8/2004 | Woo et al. | ............ | 714/25 |
| 2008/0147932 A1 | 6/2008 | Fukazawa et al. | | |

FOREIGN PATENT DOCUMENTS

| | | |
|---|---|---|
| JP | 2005-251060 | 9/2005 |
| JP | 2006-330506 | 12/2006 |
| JP | 2008-097527 | 4/2008 |

* cited by examiner

Primary Examiner — Scott T Baderman
Assistant Examiner — Joseph Schell
(74) Attorney, Agent, or Firm — Antonelli, Terry, Stout & Kraus, LLP.

(57) ABSTRACT

There is provided a file sharing system which allows accessing a memory that stores failure information and using the failure information even in a case where a CPU is shut down. When a failure occurs on a substrate, a control circuit on the substrate detects the failure and stores the information on the failure to an NVRAM. In a normal case, an OS loads the failure information and transmits it to a PC for maintenance. Upon shut down of the OS, a BMC loads the failure information from the NVRAM according to an instruction from the PC for maintenance. If an operator operates a manual switch upon power shut down, the BMC operates with the power supply from a battery, and the failure information is obtained from the NVRAM.

8 Claims, 12 Drawing Sheets

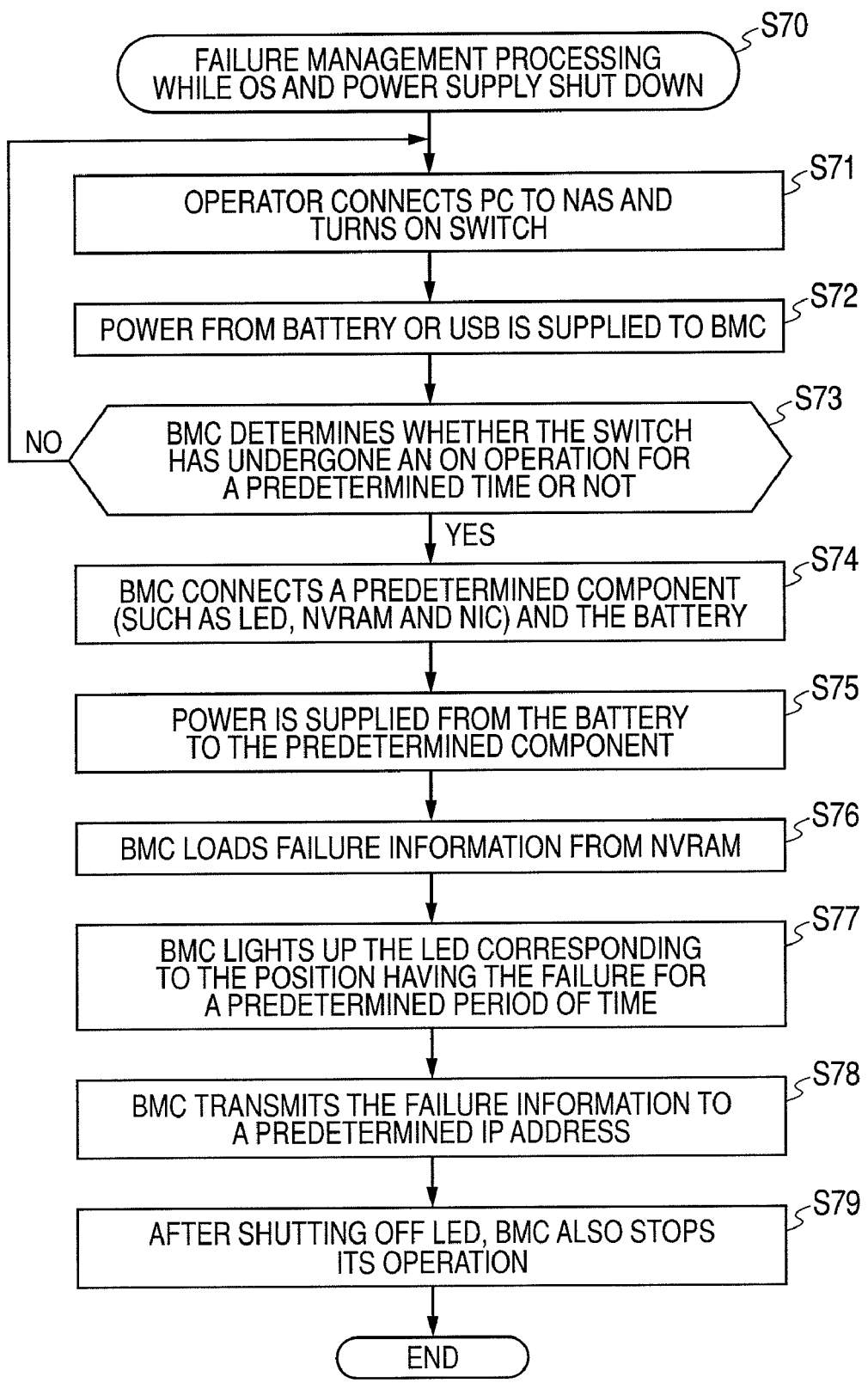

FILE SHARING SYSTEM AND METHOD FOR STORING AND MANAGING FAILURE INFORMATION BASED ON STATUSES OF A MAIN CONTROL AND A POWER SUPPLY

CROSS REFERENCES TO RELATED APPLICATIONS

This application relates to and claims priority from Japanese Patent Application No. 2008-185641, filed on Jul. 17, 2008, the entire disclosure of which is incorporated herein by reference.

BACKGROUND OF THE INVENTION

1. Field of the Invention

The present invention relates to a file sharing apparatus and a file sharing system.

2. Description of the Related Art

A file sharing apparatus is used for sharing data between/among multiple computers distributed over a network. As an initial file sharing apparatus, a file server is known which implements a file sharing protocol, such as a CIFS (or Common Internet File System) and an NFS (Network File System), to a generic OS (or Operating System). As an improved file sharing system, a NAS (or a Network Attached Storage) is known which supports multiple file sharing protocols (CIFS, NFS, DAFS (or Direct Access File System) and so on) by using a special OS which is specific to a file sharing service.

JP-A-2008-097527 discloses a file sharing apparatus that internally contains multiple controllers, whereby the controllers can backup the other party mutually. JP-A-2005-251060 and JP-A-2006-330506 also disclose a technology that displays a failure part though it is not a technology relating to a file sharing apparatus.

SUMMARY OF THE INVENTION

In a conventional file sharing apparatus, an OS manages a failure and may transmit it or give an alarm to an external apparatus. Therefore, in a case where the OS is terminated and is disabled to operate normally due to some failure, it is difficult to locate the occurring failure. It is further difficult to obtain information on the failure if a power supply apparatus, for example, has an abnormality and the entire apparatus is terminated therefor. If information on the failure is not available from the file sharing apparatus, enormous amounts of time and efforts are required for locating the occurring failure and clarifying the cause or causes.

The invention was made in view of the problem, and it is an object of the invention to provide a file sharing apparatus and a file sharing system by which information on a failure is available even in a case where a main control section is not operating normally or a case where power supply is shut down. Further objects of the invention will be apparent from the later description of embodiments.

In order to solve the problems, according to a first aspect of the invention, there is provided a file sharing apparatus that performs file sharing processing, the apparatus including a failure detecting section that detects the occurrence of a failure, a failure information storage section that stores failure information describing information on the detected failure, a main control section that performs the file sharing processing and obtains the failure information from the failure information storage section and transmits it to an apparatus for maintenance, a failure information managing section that obtains the failure information from the failure information storage section in a case where the main control stops operating, and a power supply unit that supplies a predetermined amount of power to each of the failure detecting section, the main control section and the failure information managing section.

The apparatus may further include a switch to be operated by a user for supplying backup power to predetermined components at least including the failure information storage section and the failure information managing section, wherein the failure information managing section operates in response to the supply of the backup power and obtains the failure information from the failure information storage section in a case where the main control section and the power supply unit stop.

The predetermined components may include multiple light emitting units, and the failure information managing section may cause the light emitting unit corresponding to the part having the failure among the light emitting units to light up or blink based on the obtained failure information.

The failure information managing section may transmit the obtained failure information to the apparatus for maintenance the address information of which is predefined as a destination.

The backup power supply may be an internal small power battery.

The backup power supply may be an external power supply to be externally supplied.

The external power supply may be provided within the apparatus for maintenance.

The failure information managing section and the failure information storage section may be provided on one same electronic circuit substrate.

The failure information managing section may operate based on an inquiry from the apparatus for maintenance and obtains the failure information from the failure information storage section in a case where the main control section stops and the power supply unit is operating normally.

The failure information managing section may transmit the obtained failure information to the apparatus for maintenance as a response to the inquiry from the apparatus for maintenance.

According to a second aspect of the invention, there is provided a file sharing apparatus that performs file sharing processing, the apparatus including a chassis, a first communication control substrate provided within the chassis, which communicates with a host computer, a second communication control substrate provided within the chassis, which communicates with a storage device, a main control substrate positioned within the chassis and connected to the first communication control substrate and the second communication control substrate, which performs the file sharing processing, a first failure detecting section provided on the first communication control substrate, which detects a failure occurring on the first communication control substrate, a second failure detecting section provided on the second communication control substrate, which detects a failure occurring on the second communication control substrate, a third failure detecting section provided on the main control substrate, which detects a failure occurring on the main control substrate, a failure information storage section provided on the first communication control substrate for storing failure information describing information on a failure detected by the failure information detecting section, a failure information managing section provided on the first communication control substrate for obtaining the failure information from the failure information storage section in a predetermined case, a power supply unit that supplies a predetermined amount of power to each of the substrates, and a switch to be operated by a user for supplying backup power to predetermined components at least including the failure information storage section and the failure information managing section, wherein the main control substrate obtains the failure information from the failure information storage section and transmits it to an apparatus for maintenance in a first case where the main control substrate and the power supply unit are operating normally, the failure information managing section operates based on an inquiry from the apparatus for maintenance and obtains the failure information from the failure information storage section in a second case where the main control substrate is not operating normally and the power supply unit is operating normally, and the failure information managing section operates in response to the supply of the backup power by an operation on the switch and obtains the failure information from the failure information storage section in a third case where the main control substrate and the power supply unit are not operating normally.

The failure information managing section may provide the obtained failure information to the outside in the second and third cases.

The failure information managing section may transmit the obtained failure information to the apparatus for maintenance in the second and third cases.

The chassis may have multiple light emitting units so as to visually check from the outside, and the failure information managing section may cause the light emitting unit corresponding to the part having the failure among the light emitting units to light up or blink based on the obtained failure information in the second and third cases.

According to the third aspect of the invention, there is provided a file sharing system including a file sharing apparatus that provides a file sharing service to a host computer and an apparatus for maintenance connected to the file sharing apparatus over a communication network for maintaining the file sharing apparatus, wherein the file sharing apparatus has a chassis, a failure detecting section provided within the chassis, which detects a failure occurring within the chassis, a failure information storage section provided within the chassis, which stores failure information describing information on the detected failure, a main control section provided within the chassis, which provides a file sharing service to a host computer and obtains the failure information from the failure information storage section and transmits it to the apparatus for maintenance, a failure information managing section provided within the chassis, which obtains the failure information from the failure information storage section and provides it to the apparatus for maintenance in a case where the main control section stops operating, and the apparatus for maintenance analyzes a failure based on the failure information obtained from one of the main control section and the failure information managing section and causes the result of the analysis to display on a screen.

BRIEF DESCRIPTION OF THE DRAWINGS

FIG. 12 is a flow showing failure management processing according to the fourth embodiment to which the invention is applied.

DESCRIPTION OF THE PREFERRED EMBODIMENTS

With reference to drawings, embodiments of the invention will be described below. According to an embodiment of the invention, failure information is made available based on an external trigger (such as an instruction by an operator and an inquiry from an apparatus for maintenance) in a case where a main control section and/or a power supply unit stop and failure information cannot be retrieved from a file sharing apparatus through a normal route, as will be described later.

First Embodiment

Figure 1:
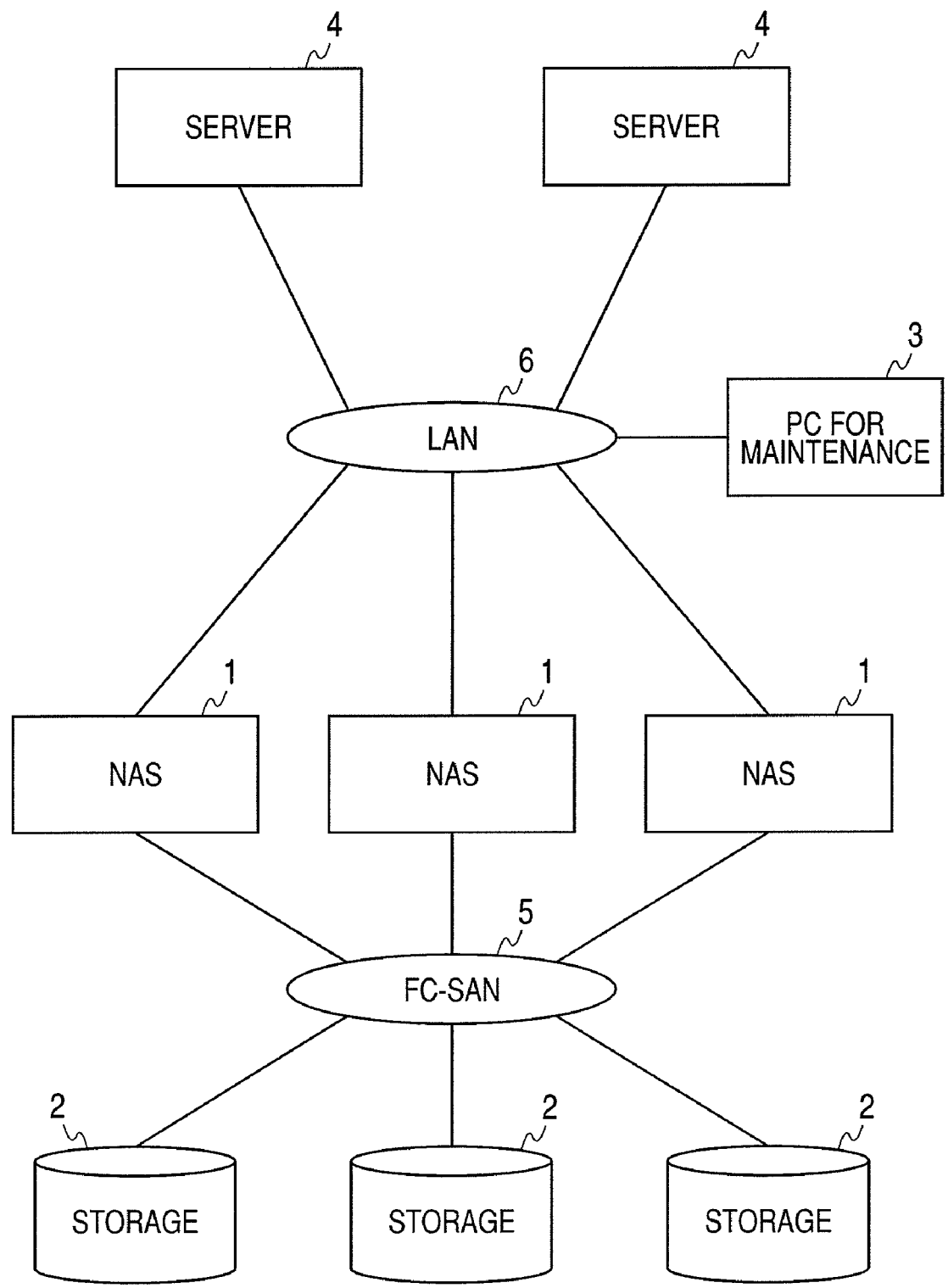
FIG. 1 shows an entire configuration of a file sharing system according to an embodiment to which the invention is applied.

FIG. 1 is an explanatory diagram showing an entire configuration of a file sharing system according to an embodiment to which the invention is applied. The file sharing system may include at least one file sharing apparatus (which will be called NAS) 1, at least one storage device (which will be called storage), at least one PC for maintenance 3, and at least one server 4.

The NAS 1 is an apparatus that provides a file sharing service to the server 4 as the "host computer". Details of the NAS 1 will be described later with reference to FIG. 2 and soon. The storage 2 functioning as the "storage device" stores data received from the NAS 1.

The storage 2 may include a physical storage device and a controller that controls the physical storage device (both of which are not shown), for example. The physical storage device may be a device from/to which data can be read/written, such as a hard disk device, a semiconductor memory device, an optical disk device, a magneto-optical disk device, a magnetic tape device and a flexible disk device.

In a case where a hard disk device is used as the storage device, an FC (or Fibre Channel) disk, a SCSI (or Small Computer System Interface) disk, a SATA disk, an ATA (or AT Attachment) disk or a SAS (Serial Attached SCSI) disk may be used, for example. In a case where a semiconductor memory device is used as the storage device, various memory devices can be used, such as a flash memory, an FeRAM (or Ferroelectric Random Access Memory), an MRAM (Magnetoresistive Random Access Memory), a phase change memory (or Ovonic Unified Memory), and a RRAM (or Resistance RAM).

The PC for maintenance 3 as the "apparatus for maintenance" may be configured as a personal computer or a server computer, for example. The PC for maintenance 3 manages the state of each NAS 1 and displays the presence of a failure on the screen of the PC for maintenance 3.

Each NAS 1 and each storage 2 are connected over a communication network 5 such as an FC_SAN (or Fibre Channel_Storage Area Network). Each NAS 1, the PC for maintenance 3 and each server 4 are connected over a communication network 6 such as a LAN (Local Area Network) and the Internet.

Figure 2:
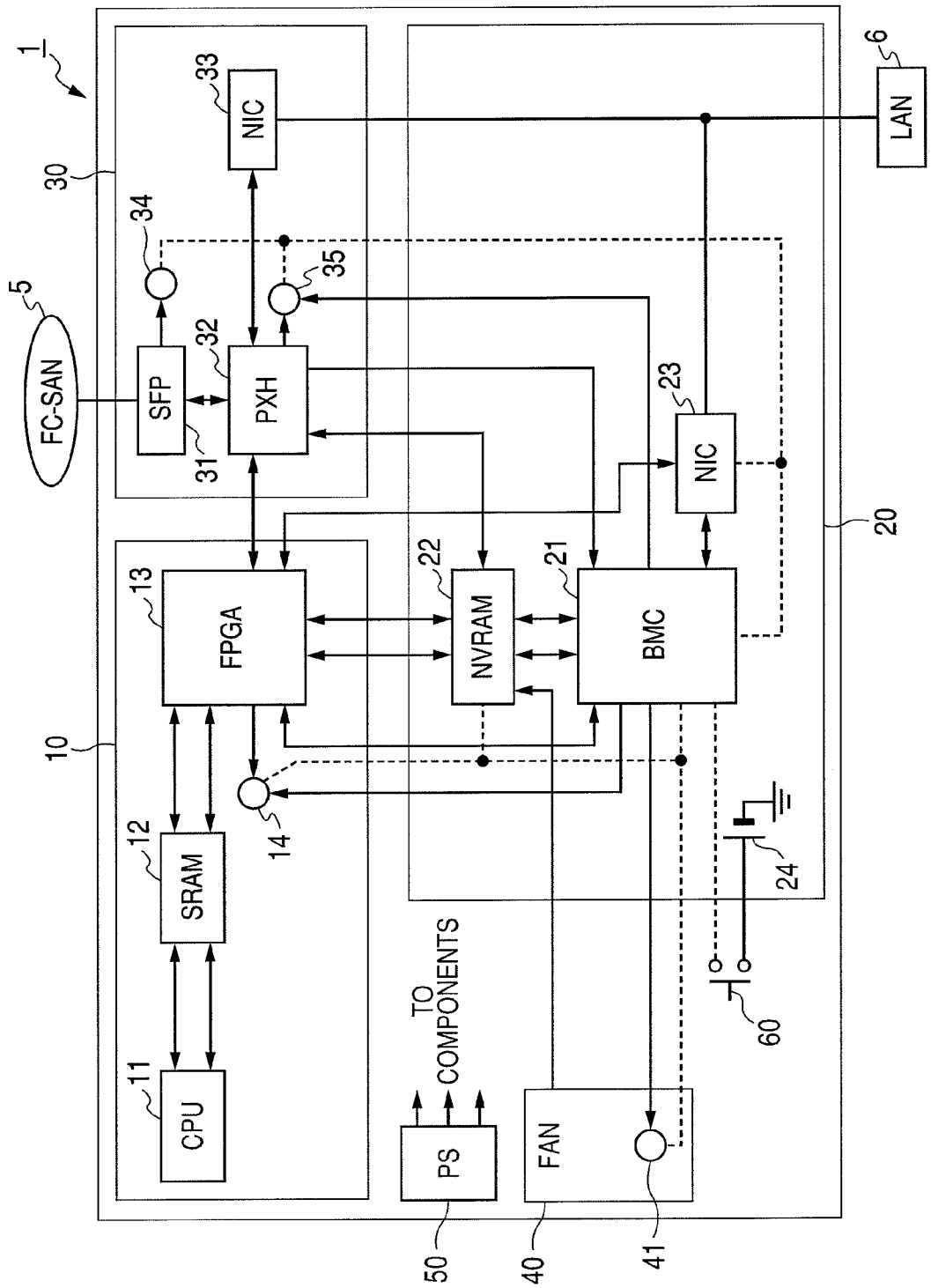
FIG. 2 shows a configuration of NAS within a file sharing system according to an embodiment to which the invention is applied.

FIG. 2 shows a block diagram showing a configuration of the NAS 1. The square frame showing the external form of the NAS 1 also represents the chassis of the NAS 1. The NAS 1 may include a main control substrate 10, a first communication control substrate 20, a second communication control substrate 30, a cooling fan 40, a power supply device 50 as the "power supply unit" and a switch 60, for example.

The main control substrate 10 is a substrate that controls an operation of the NAS 1. The main control substrate 10 may include a microprocessor 11, a memory 12, a control LSI (or Large-Scale Integrated circuit) 13, and a light emitting diode 14 as the "light emitting unit", for example.

The microprocessor (or CPU in FIG. 2) 11 loads and executes a program stored in the memory (or SRAM in FIG. 2) 12. Thus, the main control substrate 10 performs a predetermined routine such as a file sharing processing. The memory 12 may be configured as an SRAM (or Static Random Access Memory) but may be any type of memory. At least a part of programs and data to be used by the microprocessor 11 can also be stored within the storage 2.

The control LSI 13 may be configured as a programmable LSI such as an FPGA (Field Programmable Gate Array). The control LSI 13 may also be configured as a special LSI instead of an FPGA. The control LSI 13 performs a predetermined routine such as data transfer. For convenience, the microprocessor 11, memory 12 and control LSI 13 will be called CPU 11, SRAM 12 and FPGA 13 in the description below.

The first communication control substrate 20 is a substrate for communicating with each server 4 over the communication network 6. The first communication control substrate 20 may include an environmental control LSI (or BMC: Base board Management Controller in FIG. 2) 21, a non-volatile memory (or NVRAM in FIG. 2) 22, an NIC (or Network Interface Card) 23 and a battery 24, for example. The environmental control LSI 21 and the non-volatile memory 22 will be called BMC 21 and the NVRAM 22, respectively, hereinafter.

The BMC 21 obtains failure information from the NVRAM 22 instead of the CPU 11 upon shut down of the main control substrate 10 (or upon OS shut down). The BMC 21 further feeds power to predetermined components (such as the NVRAM 22, NIC 23 and light emitting diodes 14, 34, 35 and 41) at a predetermined time when the power supply device 50 is shut down. The BMC 21 further controls the lighting of the light emitting diodes 14, 34, 35 and 41 distributed within the NAS 1.

The NVRAM 22 is a memory for storing failure information collected on the substrates 10, 20 and 30. The failure information refers to information describing the position of occurrence or type of a failure. The memory for storing failure information is preferably a non-volatile memory. However, in some cases, a volatile memory backed up by a battery, for example, may be used.

The NIC 23 is a circuit for performing communication over the communication network 6. The battery 24 corresponds to the "backup power supply" and may be configured as a small battery such as a button battery. The battery 24 is originally used for keeping times, for example. The light emitting diode 14 is associated with the FPGA 13.

The second communication control substrate 30 is a substrate for communicating with each storage 2 over the communication network 5. The second communication control section 30 may include an SFP (or Small Form-Factor Pluggable) 31, a control LSI (or PXH in FIG. 2) 32, an NIC 33 and the light emitting diodes 34 and 35, for example.

The SFP 31 is a circuit for performing communication based on the Fibre Channel Protocol. The PXH 32 is a circuit that controls an operation of the second communication control substrate 30. The NIC 33 is a circuit for performing communication over the communication network 6. The light emitting diode 34 is associated with the SFP 31. The light emitting diode 35 is associated with the PXH 32.

The cooling fan 40 feeds external air into the chassis of the NAS 1 for cooling. The light emitting diode 41 is associated with the cooling fan 40.

The power supply device 50 supplies power at a predetermined voltage to the substrates 10, 20 and 30 and the cooling fan 40 within the NAS 1. For convenience, the power supply device 50 connects to the NVRAM 22, not shown, so that information can be stored in the NVRAM 22 upon occurrence of a failure.

Here, the "failure detecting section" may correspond to the CPU 11, FPGA 13, SFP 31, PXH 32 and BMC 21. The NVRAM 22 corresponds to the "failure information storage section". The CPU 11 corresponds to the "main control section". The BMC 21 corresponds to the "failure information managing section".

Figure 3:
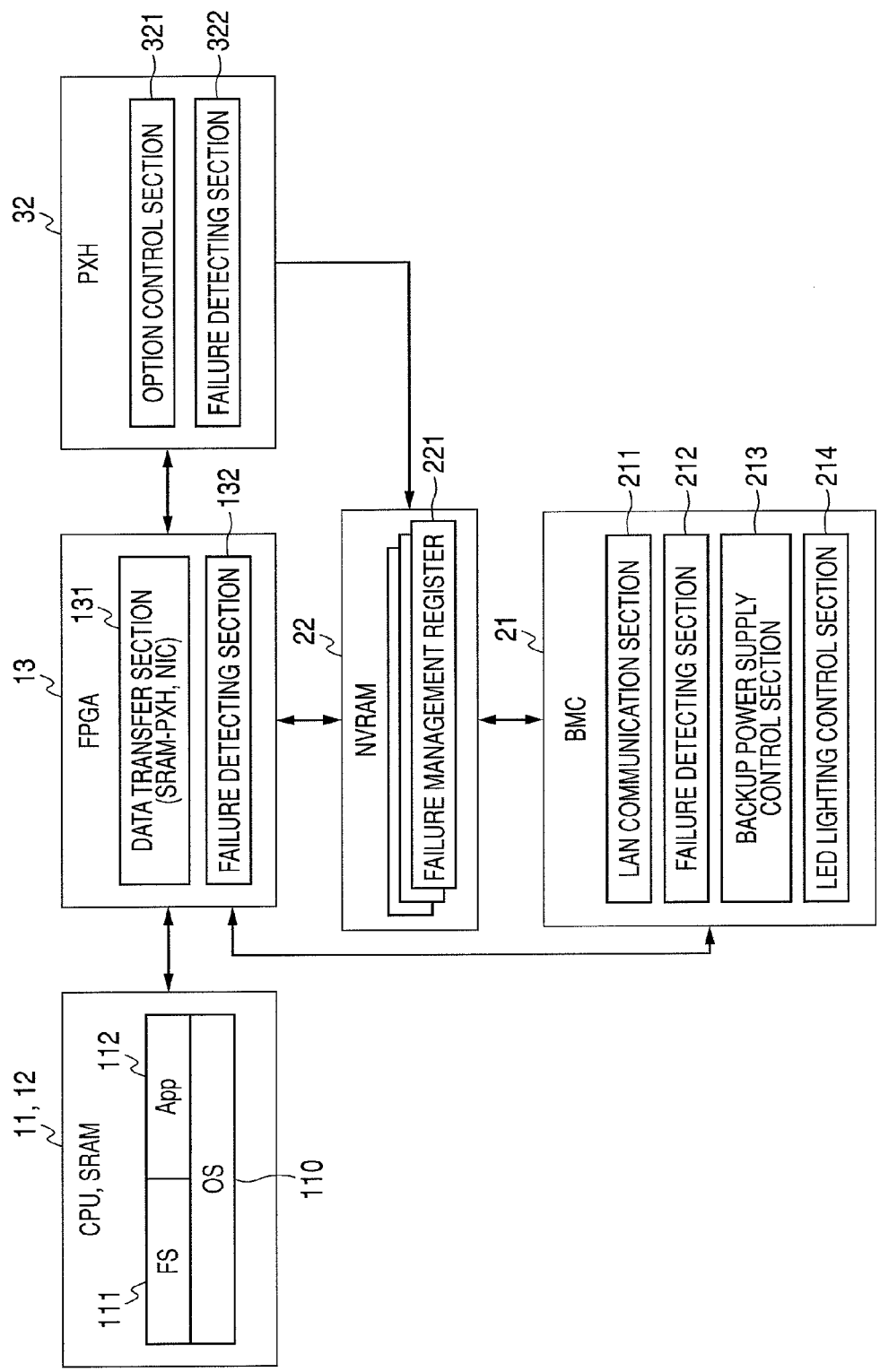
FIG. 3 shows functions of main components of a file sharing system according to an embodiment to which the invention is applied.

FIG. 3 is an explanatory diagram showing roles played by several circuits of the circuits of the NAS 1. The CPU 11 and the SPRM 12 may operate an OS 110, a file system (FS) 111 and an application program (App) 112. The application program 112 may be a failover control program, for example.

The failover is processing for offloading the processing from one NAS 1 and placing it on another NAS 1 if the one NAS 1 stops. If one or multiple NAS 1 is or are failed and stops or stop among the multiple NAS 1, a predetermined NAS 1 of the normally operating NAS 1 substitutes as the NAS 1 that is or are failed and stops or stop.

The FPGA 13 may include a data transfer section 131 and a failure detecting section 132, for example. The data transfer section 131 is a function of performing data transfer between the SRAM 12 and the PXH 32 or NIC 23. The failure detecting section 132 is a function of detecting a failure occurring within the main control substrate 10 and writing failure information on the failure to the NVRAM 22.

The PXH 32 may include an option control section 321 and a failure detecting section 322, for example. The option control section 321 is a function of controlling an operation of the second communication control substrate 30, which is handled as an extensible option item. The failure detecting section 322 is a function of detecting a failure occurring within the second communication control substrate 30 and writing failure information on the failure to the NVRAM 22.

The NVRAM 22 includes a register 221 for managing failure information. Details of the register 221 will be described later with reference to FIG. 4.

The BMC 21 may include a LAN communication section 211, a failure detecting section 212, a backup power supply control section 213 and a light emitting diode (or LED in FIG. 2) lighting control section 214, for example. Here, it should be noted that the BMC 21 does not have control functions such as the OS and a file system, unlike the CPU 11.

The LAN communication section 211 performs communication over the communication network 6. The failure detecting section 212 has a function of detecting a failure occurring within the first communication control substrate 20 and storing failure information on the failure to a predetermined register 221 within the NVRAM 22. The backup power supply control section 213 is a function of connecting the battery 24 to a predetermined component for power supply. The LED lighting control section 214 is a function for lighting up or blinking the light emitting diode corresponding to the part having a failure.

Figure 4:
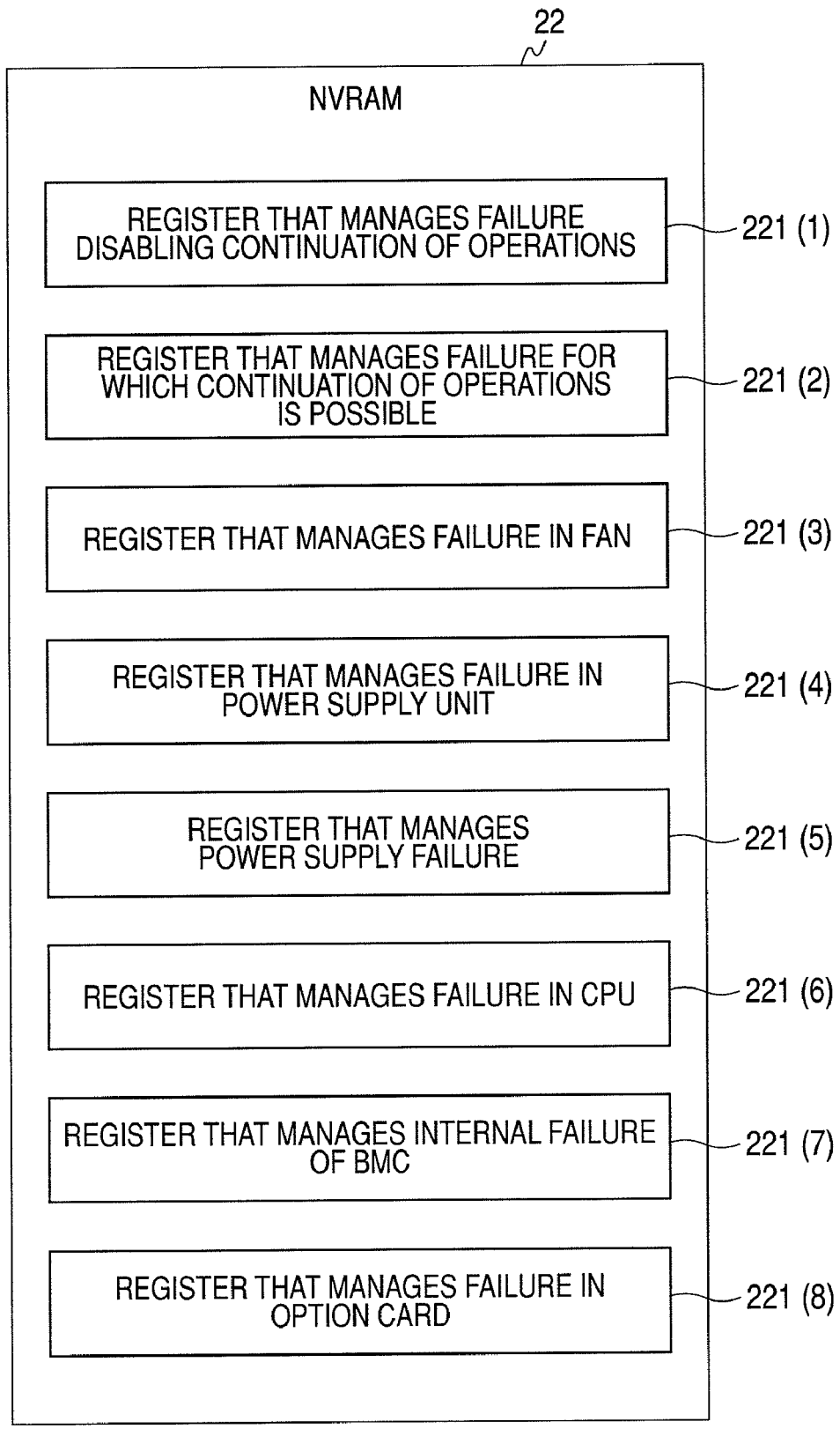
FIG. 4 shows a general outline of a register that stores failure information in a file sharing system according to an embodiment to which the invention is applied.

FIG. 4 is an explanatory diagram showing examples of registers 221(1) to 221(8) provided within the NVRAM 22. The register 221(1) that manages a failure disabling the continuation of operations manages for which the continuation of an operation of NAS 1 is difficult, such as a BIOS (or Basic Input/Output System) abnormality, a hardware failure of the CPU 11, a hardware failure of the cooling fan 40 (which is a state that all fans are disabled to operate) and a power supply abnormality.

The register 221(2) that manages a failure for which the continuation of operations is possible manages a failure for which the continuation of an operation by the NAS 1 is possible, such as the occurrence of an instant power failure and a partial failure in the power supply device 50 or cooling fan 40.

The register 221(3) that manages a failure in a fan may manage which fan included in the cooling fan 40 has a hardware failure, for example. The register 221(4) that manages a failure in a power supply unit may manage a cable disconnection to the power supply device 50 or a hardware failure of the power supply device 50, for example. The register 221(5) that manages a power supply failure may manage a failure that current at a predetermined voltage is not flowing on a substrate or that a predetermined voltage is not output from the power supply device 50, for example. The register 221(6) that manages a failure in the CPU may manage an abnormality in temperature of the CPU 11 or a hardware failure in the CPU 11, for example. The register 221(7) that manages an internal failure of a BMC may manage a failure occurring in a counter or a sequencer within the BMC 21 or a failure occurring in a register within the BMC 21, for example. The register 221(8) that manages a failure in an option card may manage a hardware failure in the second communication control substrate 30, which is handled as an optional card, or a failure in an optical module (or SFP).

Figure 5A:
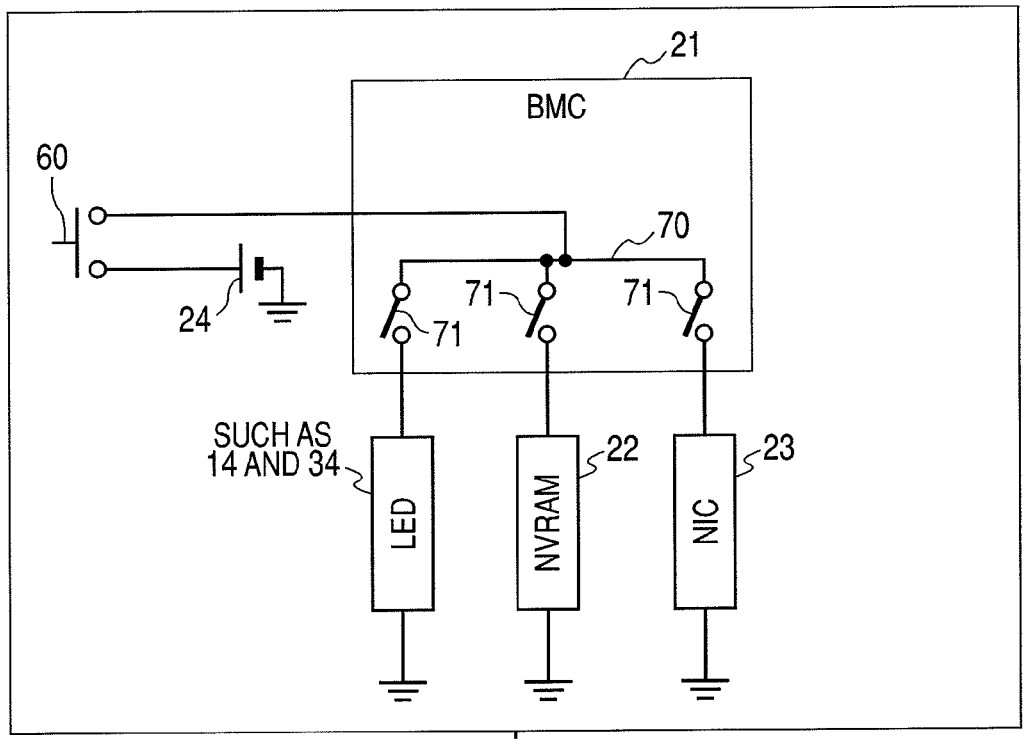
FIGS. 5A and 5B show a configuration in which a file sharing system BMC according to an embodiment to which the invention is applied controls power supply to a predetermined component.
Figure 5B:
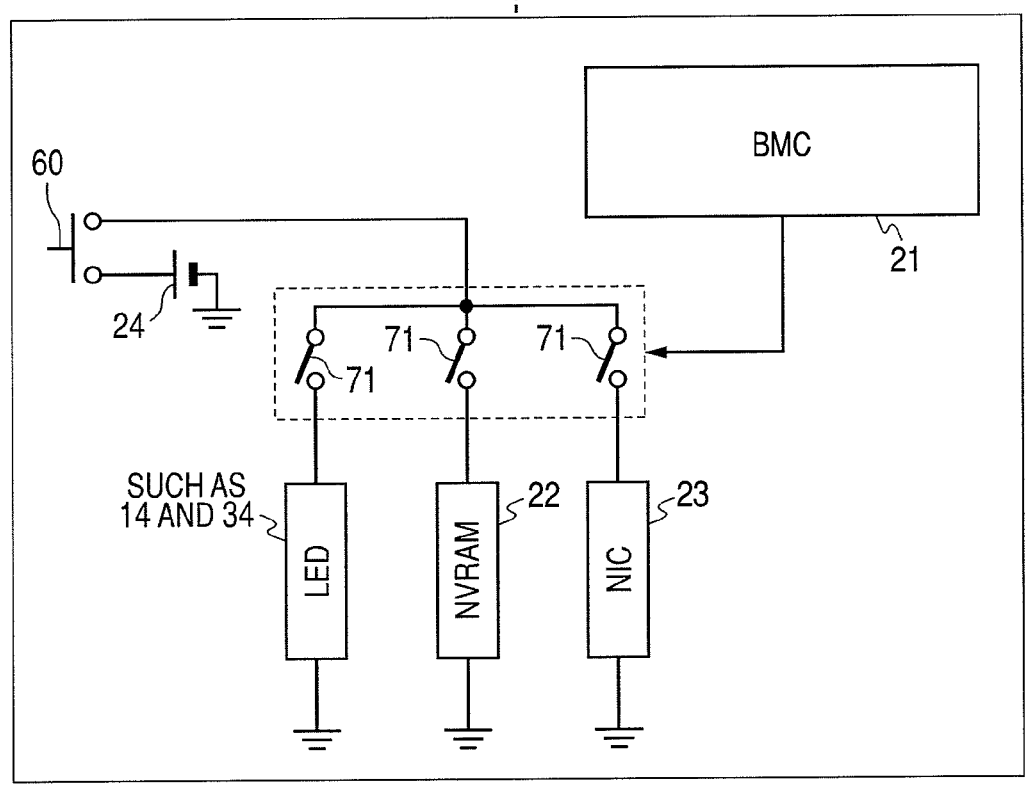

FIGS. 5A and 5B are an explanatory diagram showing a configuration in which the BMC 21 feeds power from the battery 24 to a predetermined component. As shown in FIG. 5A, a switch circuit 70 for connection control is provided within the BMC 21. For convenience of description, the light emitting diodes 14, 34, 35, 41 are not discriminated in FIGS. 5A and 5B.

The switch circuit 70 includes multiple switches 71. The switches 71 are connected to the light emitting diodes, NVRAM 22 and NIC 23. A manual switch 60 is provided between the switch circuit 70 and the battery 24. If the manual switch 60 is turned on, the power from the battery 24 is supplied to the BMC 21, whereby the BMC 21 starts. Thus, the BMC 21 turns on the switches 71 of the switch circuit 70, and the power from the battery 24 is supplied to the light emitting diodes, NVRAM 22 and NIC 23.

As shown in FIG. 5B, the switch circuit 70 may be provided outside of the BMC 21 and may be configured to control by the BMC 21.

Figure 6:
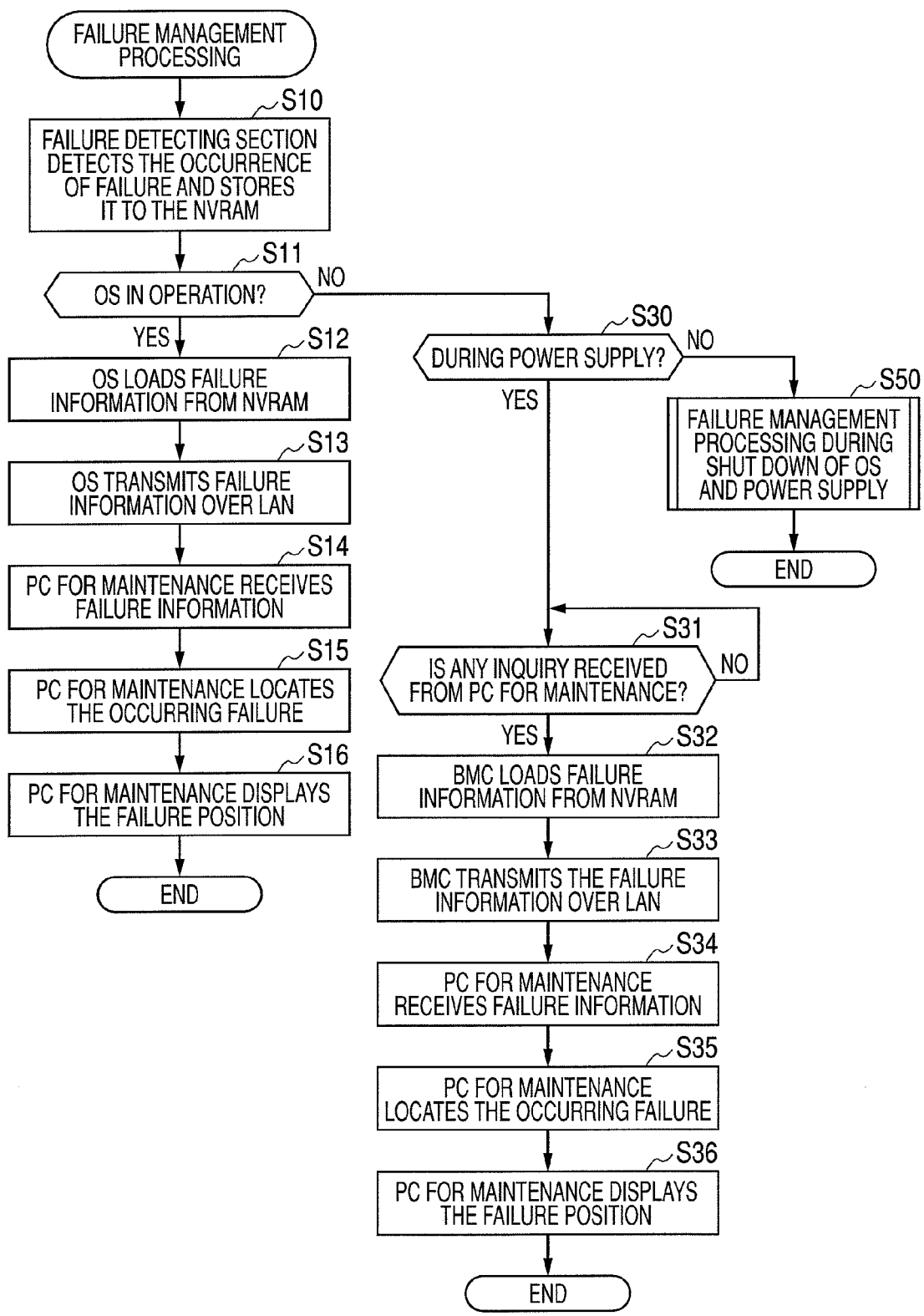
FIG. 6 shows a flow of failure management processing by a file sharing system according to a first embodiment to which the invention is applied.
Figure 7:
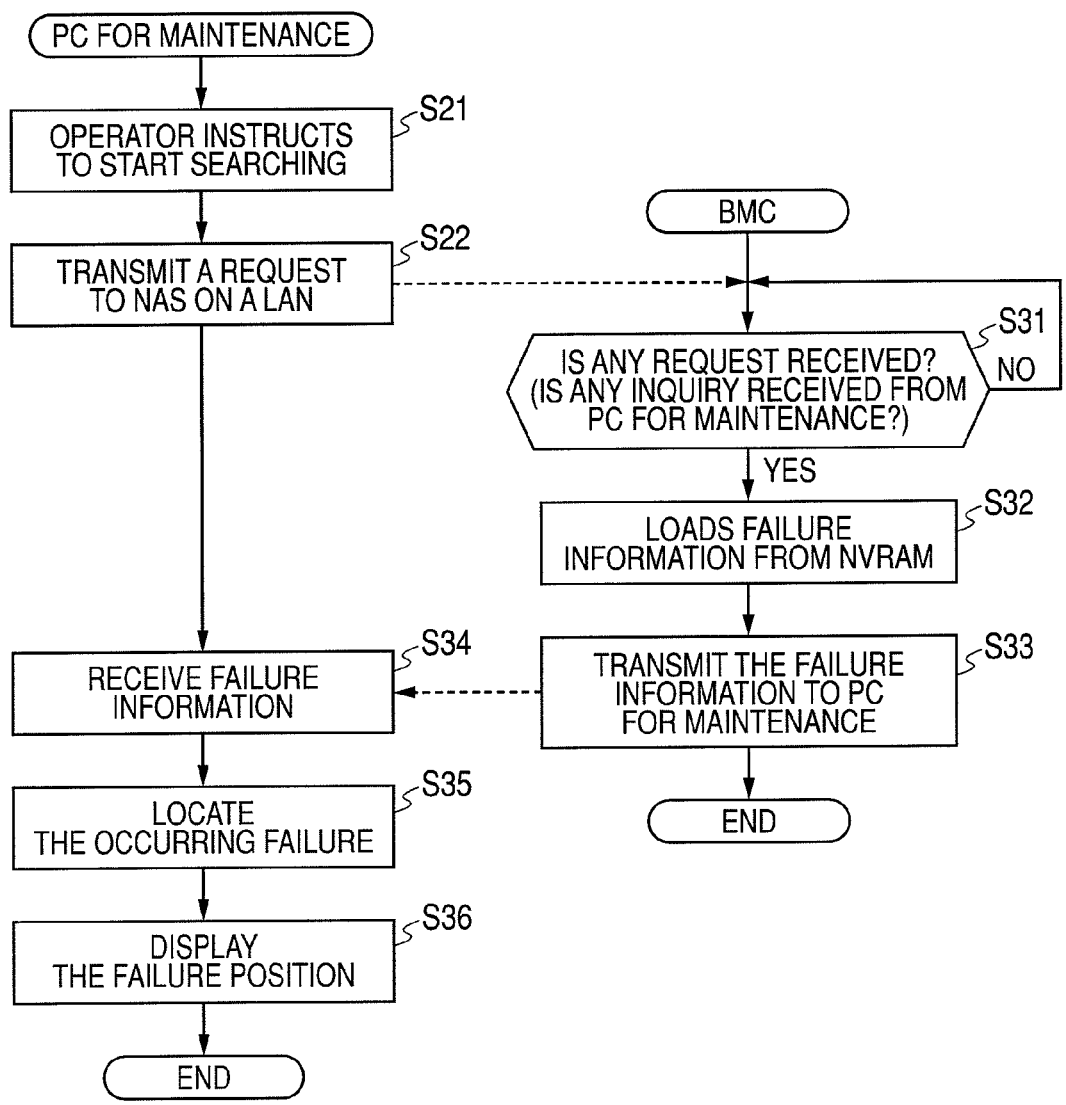
FIG. 7 shows a flow of the failure management processing by the file sharing system according to the first embodiment to which the invention is applied.
Figure 8:
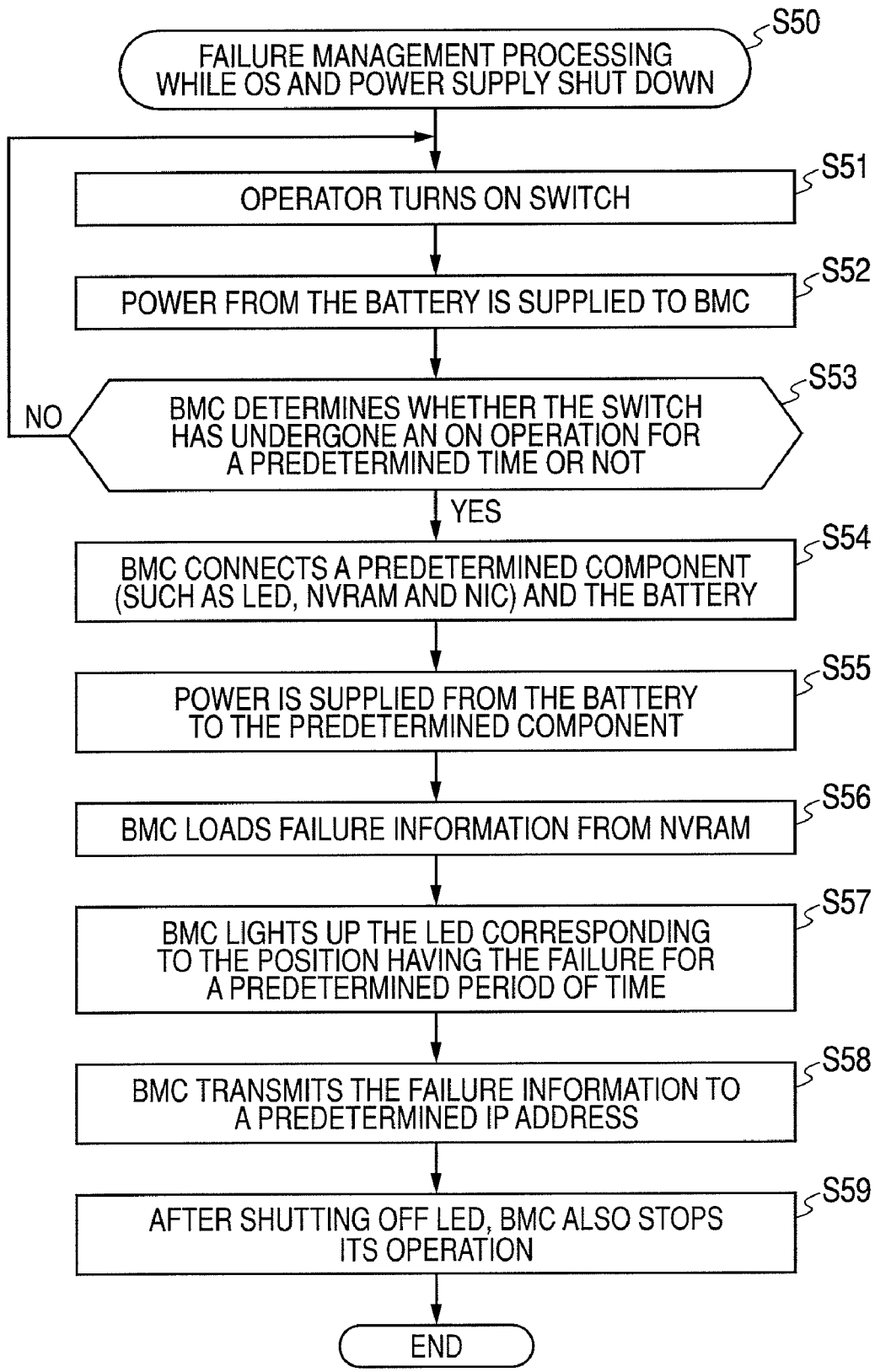
FIG. 8 shows a flow of the failure management processing by the file sharing system according to the first embodiment to which the invention is applied.

With reference to FIGS. 6 to 8, failure management processing according to this embodiment of the invention will be described. The flowcharts described below illustrate a general outline of a processing routine and may be different from that of an actual computer program. So-called those skilled in the art can delete or change shown steps, change the order of the steps and/or add a new step.

First of all, the failure detecting sections (that is, the CPU 11, FPGA 13, BMC 21, SFP 31, PXH 32, a fan 40 and power supply device 50) within the NAS 1 stores information on a detected failure within the respective responsible range if any to the NVRAM 22 (S10). Information on a failure may be stored by setting a predetermined bit within a register according to the type of failure.

If the OS is in operation, that is, the NAS 1 is operating normally (S11: YES), the OS loads failure information from the NVRAM 22 (S12). The OS transmits the failure information from the NIC 23 to the PC for maintenance 3 over the communication network 6.

The PC for maintenance 3 in response to the reception of the failure information (S14) analyzes the failure information to locate the occurring failure (S15) and displays the analysis result to the screen (S16). The PC for maintenance 3 can transmit an electronic mail to a pre-registered electronic mail address as required. The steps S11 to S16 relate to the processing in a case where the NAS 1 is operating normally, that is, the "first case".

Referring to steps S30 to S36, the "second case" will be described where power is supplied from the power supply device 50 but the main control substrate 10 is not operating normally. If the OS is not in operation (S11: NO), whether power is being supplied from the power supply device 50 or not is determined (S30). If power is being supplied from the power supply device 50 (S30: YES), the BMC 21 instead of the OS obtains failure information from the NVRAM 22.

First of all, the BMC 21 determines whether any inquiry is received from the PC for maintenance 3 or not (S31), the details of which will be described later with reference to FIG. 7. If so (S31: YES), the BMC 21 loads failure information from the NVRAM 22 (S32). The BMC 21 transmits the failure information to the PC for maintenance 3 through the NIC 23 and over the communication network 6 (S33).

Subsequently, like the first case, the PC for maintenance 3 in response to the reception of failure information (S34) analyzes the failure information to locate the occurring failure (S35) and displays the analysis result to the screen (S36).

The third case where both of the main control substrate 10 and the power supply device 50 are not operating normally (S30: NO, then move to S50) will be described with reference to FIG. 8. Before the description, details (steps S31 to S36) in the second case will be described with reference to FIG. 7.

An operator may operate a keyboard switch of the PC for maintenance 3, for example, to instruct to start searching to the PC for maintenance 3 (S21). In response to the instruction, the PC for maintenance 3 transmits a packet indicating a request to the NAS 1 (S22).

Subsequently, as described with reference to FIG. 6, the BMC 21 in response to the reception of a request from the PC for maintenance 3 (S31: YES) loads failure information from the NVRAM 22 (S32) and transmits it to the PC for maintenance 3 (S33).

FIG. 8 is a flowchart showing details of step S50 in FIG. 6. In the "third case" where both of the main control substrate 10 and the power supply device 50 are not operating normally, an operator may turn on the manual switch 60 (S51). Thus, power from the battery 24 is supplied to the BMC 21 (S52), and the BMC 21 thus starts.

The BMC 21 determines whether the manual switch 60 has undergone an ON operation for a predefined time (such as approximately 5 seconds) or not (S53). If so (S53: YES), the BMC 21 controls the switch circuit 70 to connect a predetermined component and the battery 24 (S54). Thus, power is supplied from the battery 24 to the predetermined component (S55). At the times of steps S54 and S55, the BMC 21 does not turn on the switches 71 connecting to the light emitting diodes.

Next, the BMC 21 loads failure information from the NVRAM 22 (S56). The BMC 21 controls the switch circuit 70 based on the failure information to light up or blink the light emitting diode corresponding to the position having the failure only for a predetermined period of time (S57). In other words, in step S57, power is not supplied to the light emitting diodes in steps S54 and S55 so as to light up or blink the required light emitting diode only.

Next, the BMC 21 transmits the failure information to a predetermined IP (or Internet Protocol) address (S58). For example, the IP address of the PC for maintenance 3 is predefined to the BMC 21 as the destination IP address.

Then, after shutting off the light emitting diode, the BMC 21 stops its operation and exits the processing (S59). Thus, the life of the battery 24 can be extended. An operator may turn on the manual switch 60 any number of times to check the lighting state of the light emitting diodes during a period that a predetermined or higher amount of electric energy remains in the battery 24.

According to the first embodiment of the invention in the configuration above, failure information stored in the NVRAM 22 can be used even in a case where the main control substrate 10 is not operating normally. Therefore, the operation for locating a failure, for example, can be performed efficiently.

According to the first embodiment, when an operator turns on the manual switch 60, the power of the battery 24 can be supplied to a predetermined component of the BMC 21 so that failure information stored in the NVRAM 22 can be used. Therefore, even in a case where the power supply device 50 is failed or has a power failure for a long period of time, the failure information can be used to perform a maintenance operation.

According to the first embodiment, even in a case where both of the main control substrate 10 and the power supply device 50 are not operating normally, the light emitting diode 14, 34, 35 or 41 corresponding to the failure may be lighted up or blink. Therefore, an operator can immediately locate the failure only by checking which light emitting diode is lighted on.

According to the first embodiment, even in a case where the main control substrate 10 is not operating normally, the failure information stored in the NVRAM 22 can be transmitted to the PC for maintenance 3. Therefore, the PC for maintenance 3 can analyze the failure information and display the result on the screen.

According to the first embodiment, the small battery 24 internally contained in the NAS 1 can be used to load failure information from the NVRAM 22 or light up a light emitting diode. Therefore, the battery 24 for keeping times can be effectively used to increase the efficiency of a maintenance operation, without requiring the preparation of any special backup power supply such as a battery, for example.

According to the first embodiment, the NVRAM 22 functioning as the failure information storage section and the BMC 21 functioning as the failure managing section are mounted on the first communication control substrate 20. Therefore, in a case where the power supply device 50 is failed, the power of the battery 24 can be supplied to the BMC 21 and the NVRAM 22 efficiently. As a result, the life of the battery 24 can be extended. Particularly, since the battery 24 is also provided on the same substrate 20 as that of the BMC 21 and NVRAM 22, which are power consuming sections, a shorter electric path is only required therefor, which can reduce the number of wasteful voltage drops and can extend the life of the battery 24.

According to the first embodiment, the BMC 21 transmits failure information to the PC for maintenance 3 according to a request from the PC for maintenance 3. Thus, an operator can use the PC for maintenance 3 to use failure information at a remote place from the NAS 1. Therefore, the efficiency of the maintenance operation can be improved.

According to the first embodiment, in response to the request from the PC for maintenance 3, the BMC 21 transmits failure information to the PC for maintenance 3. Therefore, the configuration can be simplified without requiring the registration of IP address of the PC for maintenance 3 to the BMC 21 in advance.

Second Embodiment

Figure 9:
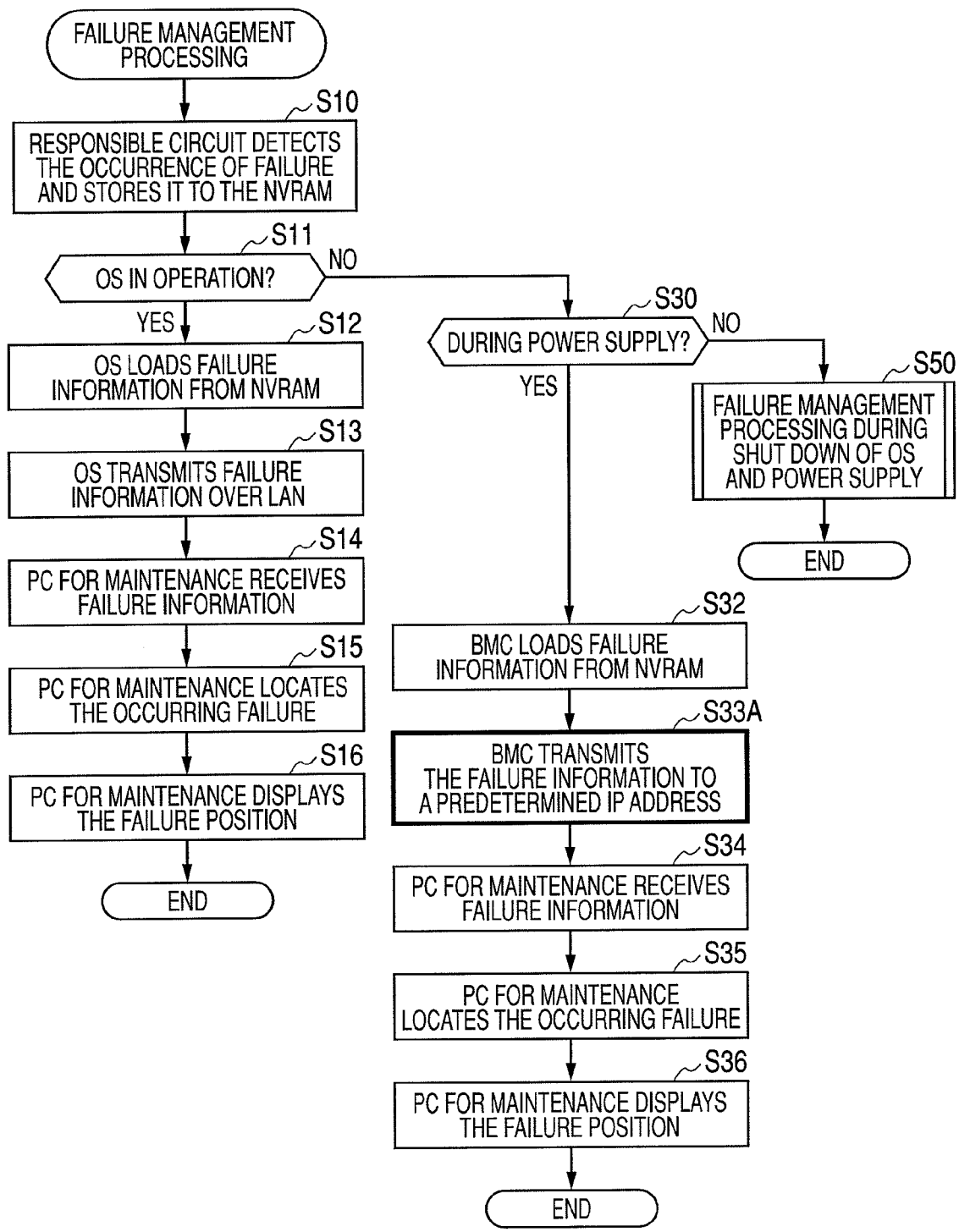
FIG. 9 shows a flow of the failure management processing to be performed by NAS according to a second embodiment to which the invention is applied.

A second embodiment of a file sharing system to which the invention is applied will be described with reference to FIG. 9. Since the embodiments below correspond to change examples of the first embodiment, differences from the first embodiment will be described mainly. FIG. 9 is a flowchart showing failure management processing according to the second embodiment.

According to the second embodiment, in a case where the main control substrate 10 is not operating normally but power is being supplied normally (that is, the second case), the BMC 21 transmits failure information to the pre-registered IP address, without waiting for a request from the PC for maintenance 3 (S33A). Since the IP address of the PC for maintenance 3 is pre-registered with the BMC 21, failure information is automatically transmitted to the PC for maintenance 3 in the second case according to the second embodiment.

The second embodiment in the configuration above can also provide the same advantages as those of the first embodiment. Furthermore, according to the second embodiment, since failure information can be automatically transmitted to the PC for maintenance 3 without waiting for a request from the PC for maintenance 3, the operability can be improved.

Third Embodiment

Figure 10:
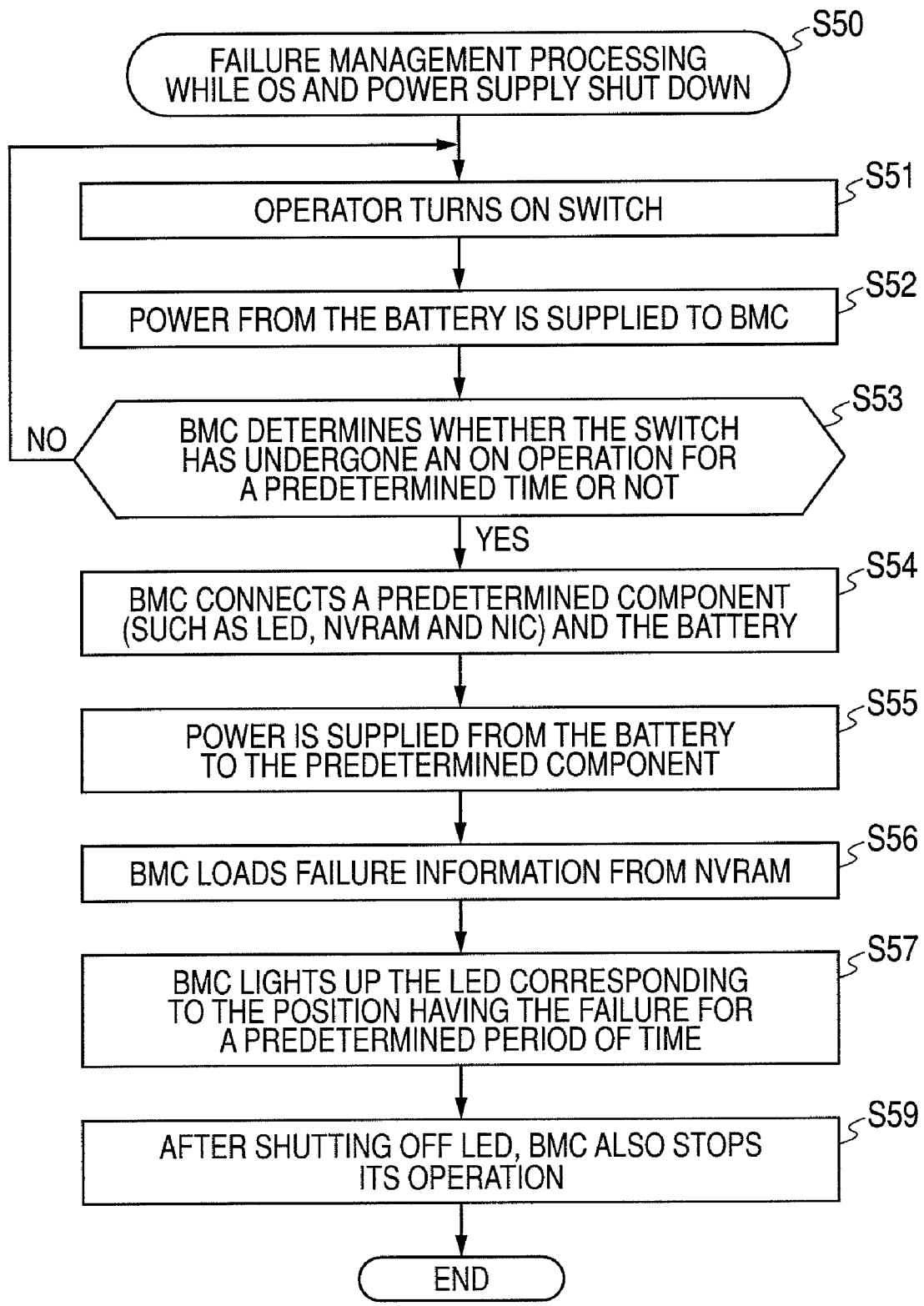
FIG. 10 shows a flow of failure management processing to be performed by NAS according to a third embodiment to which the invention is applied.

With reference FIG. 10, a third embodiment of a file sharing system to which the invention is applied will be described. According to the third embodiment, in a case where both of the main control substrate 10 and the power supply device 50 are not operating normally (that is, the third case), the light emitting diode corresponding to the position having a failure is only lighted up (S57), and failure information is not transmitted to the PC for maintenance 3. The third embodiment in the configuration above can also provide the same advantages to those of the first embodiment.

Fourth Embodiment

Figure 11:
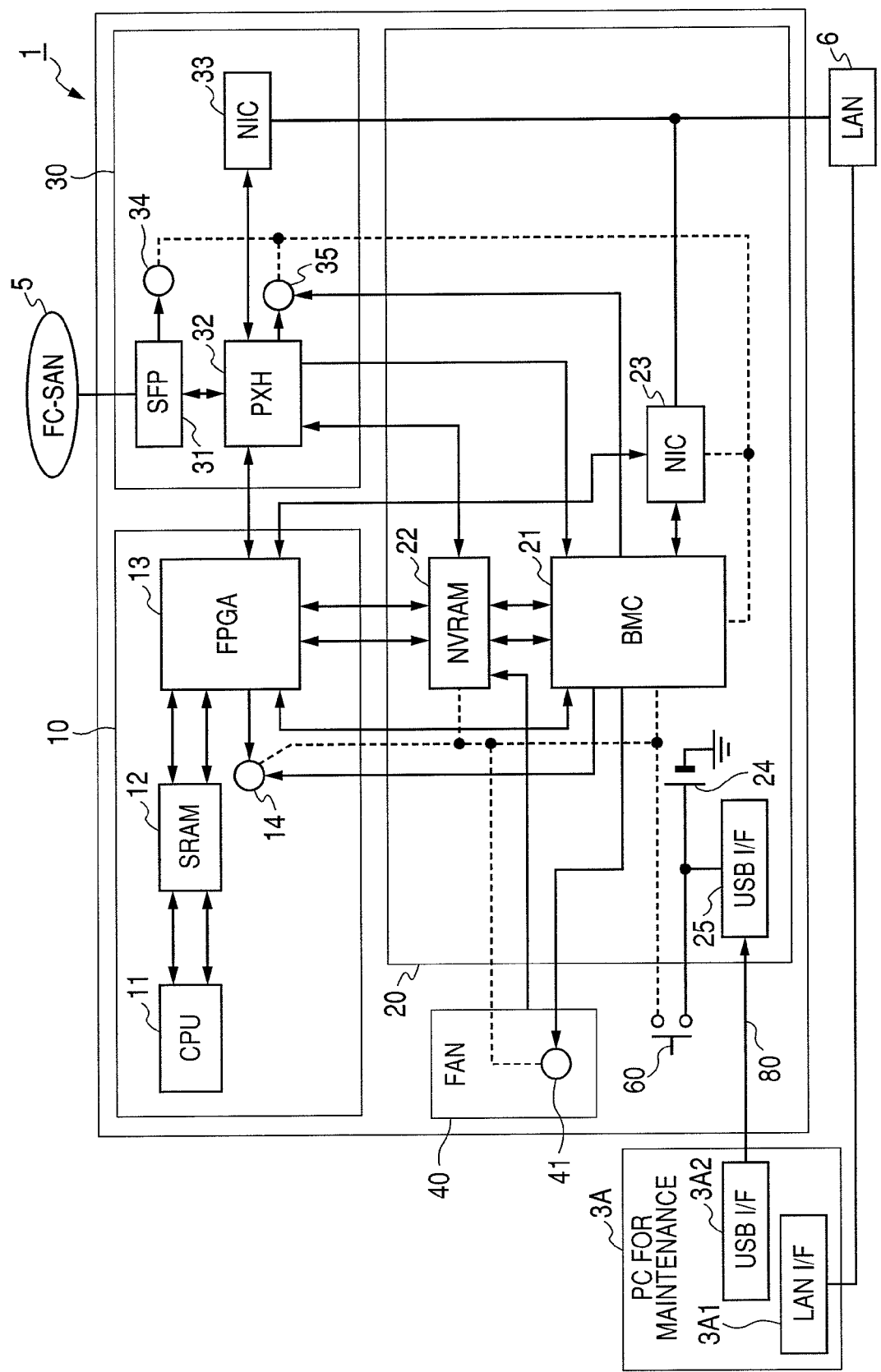
FIG. 11 shows a configuration of NAS according to a fourth embodiment to which the invention is applied.

With reference to FIGS. 11 and 12, a fourth embodiment of a file sharing system to which the invention is applied will be described. According to this embodiment, USB (or Universal Serial Bus) bus power is used as a backup power supply in a case where the power supply device 50 is failed.

FIG. 11 is a block diagram of the NAS 1 according to the fourth embodiment. The PC for maintenance 3 includes a LAN interface 3A1 and a USB interface 3A2. The LAN interface 3A1 connects to the NIC 23 and 33 within the NAS 1 over the communication network 6. The USB interface 3A2 connects to the USB interface 25 on the first communication control substrate 20 through a USB cable 80.

The USB interface 25 on the first communication control substrate 20 is only for using the USB bus power and does not connect to the main control substrate 10. However, without limiting thereto, the configuration is possible in which the USB interface 25 connects to the main control substrate 10. The position where the USB interface 25 is to be mounted is not limited to the first communication control substrate 20.

FIG. 12 is a flowchart describing failure management processing in the third case according to the fourth embodiment. An operator may connect the PC for maintenance 3 and the NAS 1 through the USB cable 80 and turn on the manual switch 60 (S71). Thus, power from the battery 24 or the USB bus power is supplied to the BMC 21 (S72), and the BMC 21 starts.

The BMC 21 determines whether the manual switch 60 has undergone an ON operation for a predefined time or not (S73). If so (S73: YES), the BMC 21 connects a predetermined component and the battery 24 and the USB bus power (S74). Thus, power is supplied from the battery 24 or the USB bus power to the predetermined component (S75).

The BMC 21 loads failure information from the NVRAM 22 (S76) and lights up or blinks the light emitting diode corresponding to the position having the failure only for a predetermined period of time (S77). The BMC 21 transmits the failure information to a predefined IP address (S78). Finally, after shutting off the light emitting diode, the BMC 21 stops its operation and exits the processing (S79).

The fourth embodiment in the configuration above can also provide the same advantages as those of the first embodiment. Furthermore, according to the fourth embodiment, since the power within the PC for maintenance 3 is used as USB bus power, failure information can be obtained from the NVRAM 22 even at the end of the life of the battery 24.

The invention is not limited to the aforesaid various embodiments. Those skilled in the art can perform various additions and/or changes thereon without departing from the scope of the invention. For example, instead of USB bus power, other external power application means such as IEEE (or Institute of Electrical and Electronic Engineers) bus power can be used. Alternatively, the BMC and the NVRAM may be integrated.

What is claimed is:

1. A file sharing apparatus that performs file sharing processing, the apparatus comprising:
   a chassis;
   a first communication control substrate provided within the chassis, which communicates with a host computer;
   a second communication control substrate provided within the chassis, which communicates with a storage device;
   a main control substrate positioned within the chassis and connected to the first communication control substrate and the second communication control substrate, which performs the file sharing processing;
   a first failure detecting section provided on the first communication control substrate, which detects a failure occurring on the first communication control substrate;
   a second failure detecting section provided on the second communication control substrate, which detects a failure occurring on the second communication control substrate;
   a third failure detecting section provided on the main control substrate, which detects a failure occurring on the main control substrate;
   a failure information storage section provided on the first communication control substrate for storing failure information describing information on a failure detected by the failure information detecting section;
   a failure information managing section provided on the first communication control substrate for obtaining the failure information from the failure information storage section in a predetermined case;
   a power supply unit that supplies a predetermined amount of power to each of the substrates; and
   a switch configured to be operated by a user for supplying backup power to predetermined components at least including the failure information storage section and the failure information managing section,
   wherein:
   the main control substrate obtains the failure information from the failure information storage section and transmits it to an apparatus for maintenance in a first case where the main control substrate and the power supply unit are operating normally;
   the failure information managing section operates based on an inquiry from the apparatus for maintenance and obtains the failure information from the failure information storage section in a second case where the main control substrate is not operating normally and the power supply unit is operating normally; and
   the failure information managing section operates in response to the supplying backup power by an operation on the switch and obtains the failure information from the failure information storage section in a third case where the main control substrate and the power supply unit are not operating normally.

2. The file sharing apparatus according to claim 1, wherein the failure information managing section provides the obtained failure information to outside the chassis in the second and third cases.

3. The file sharing apparatus according to claim 1, wherein the failure information managing section transmits the obtained failure information to the apparatus for maintenance in the second and third cases.

4. The file sharing apparatus according to claim 1, wherein:
   the chassis has multiple light emitting units that can be visually checked from outside the chassis; and
   the failure information managing section causes at least one light emitting unit which corresponds to the part having the failure among the light emitting units to light up or blink based on the obtained failure information in the second and third cases.

5. A control method for a file sharing apparatus to perform file sharing processing, wherein the file sharing apparatus includes:
   a chassis;
   a first communication control substrate provided within the chassis, which communicates with a host computer;
   a second communication control substrate provided within the chassis, which communicates with a storage device;
   a main control substrate positioned within the chassis and connected to the first communication control substrate and the second communication control substrate, which performs the file sharing processing;

a first failure detecting section provided on the first communication control substrate, which detects a failure occurring on the first communication control substrate;

a second failure detecting section provided on the second communication control substrate, which detects a failure occurring on the second communication control substrate;

a third failure detecting section provided on the main control substrate, which detects a failure occurring on the main control substrate;

a failure information storage section provided on the first communication control substrate for storing failure information describing information on a failure detected by the failure information detecting section;

a failure information managing section provided on the first communication control substrate for obtaining the failure information from the failure information storage section in a predetermined case;

a power supply unit that supplies a predetermined amount of power to each of the substrates; and a switch to be operated by a user for supplying backup power to predetermined components at least including the failure information storage section and the failure information managing section, the control method comprising:

obtaining, via the main control substrate, the failure information from the failure information storage section and transmitting it to an apparatus for maintenance in a first case where the main control substrate and the power supply unit are operating normally;

operating the failure information managing section based on an inquiry from the apparatus for maintenance and obtaining the failure information from the failure information storage section in a second case where the main control substrate is not operating normally and the power supply unit is operating normally; and operating the failure information managing section in response to the supplying backup power by an operation on the switch and obtaining the failure information from the failure information storage section in a third case where the main control substrate and the power supply unit are not operating normally.

6. The control method according to claim 5, further comprising providing, via the failure information managing section, the obtained failure information to outside the chassis in the second and third cases.

7. The control method according to claim 5, further comprising transmitting, via the failure information managing section, the obtained failure information to the apparatus for maintenance in the second and third cases.

8. The control method according to claim 5, wherein the chassis has multiple light emitting units that can be visually checked units that can be visually checked from outside the chassis, the method further comprising causing, via the failure information managing section, from outside the chassis to the part having the failure among the light emitting units to light up or blink based on the obtained failure information in the second and third cases.

* * * * *